United States Patent
Yoneyama et al.

(10) Patent No.: US 6,720,691 B2
(45) Date of Patent: Apr. 13, 2004

(54) VIBRATING DEVICE FOR TRANSMITTING INFORMATION

(75) Inventors: Akira Yoneyama, Yamanashi-ken (JP); Toshio Itakura, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/282,161

(22) Filed: Oct. 29, 2002

(65) Prior Publication Data

US 2003/0102739 A1 Jun. 5, 2003

(30) Foreign Application Priority Data

Nov. 2, 2001 (JP) .................................. 2001-338783

(51) Int. Cl.[7] .............................................. H02K 7/065
(52) U.S. Cl. ................................... 310/81; 310/80
(58) Field of Search ............................... 310/81, 80

(56) References Cited

U.S. PATENT DOCUMENTS

| | | | | |
|---|---|---|---|---|
| 5,267,111 A | * | 11/1993 | Nishimura et al. | 310/13 |
| 5,424,592 A | * | 6/1995 | Bluen et al. | 310/15 |
| 6,365,995 B1 | * | 4/2002 | Fukuda et al. | 310/81 |
| 6,404,085 B2 | * | 6/2002 | Hamaguchi et al. | 310/81 |
| 6,417,589 B1 | * | 7/2002 | Kuyama et al. | 310/81 |

* cited by examiner

*Primary Examiner*—Burton S. Mullins
*Assistant Examiner*—J. Aguirrechea
(74) *Attorney, Agent, or Firm*—Dennison, Schultz, Dougherty & MacDonald

(57) ABSTRACT

A vibrating assembly comprises a yoke having a center pole and a peripheral flange, an annular permanent magnet secured to the flange, and an annular top plate secured to the permanent magnet. A supporting plate is provided for resiliently supporting the vibrating assembly in the frame. A preventing means is provided for preventing the vibrating assembly from moving in a radial direction of the vibrating assembly.

3 Claims, 1 Drawing Sheet

VIBRATING DEVICE FOR TRANSMITTING INFORMATION

BACKGROUND OF THE INVENTION

The present invention relates to a vibrating device mounted in a portable device such as a portable telephone and PDA (personal digital assistant), for transmitting information to a wearer.

FIG. 2 is a sectional view showing a conventional vibrating device disclosed in Japanese Patent Laid Open 7-107699.

The vibrating device 53 comprises a first assembly 51 and a second assembly 52 The first assembly 51 comprises a first frame 61 made of resin and having a dish-like shape and a vibrating assembly 66 resiliently supported in the first frame by an annular spring plate 62. The vibrating assembly 66 comprises a yoke 63 made of magnetic material comprising a center pole 63a and a flange 63b, an annular permanent magnet 64 secured to the flange 63b, and an annular top plate 65 made of magnetic material and secured to the permanent magnet 64. The underside of the first frame 61 is covered by a protector 67.

The second assembly 52 comprises a second frame 71 made of resin and secured to the first frame 61 at shoulders 61a and 71a, and an annular spring plate 72 embedded in the second frame 71 and secured to the top plate 65 for holding the vibrating assembly 66. A supporting plate 73 is secured to the second frame 71 to close the second frame 71. An annular driving coil 74 is secured to an annular projection 73a formed on the underside of the supporting plate 73. The coil 74 is inserted in a magnetic gap 66a between the center pole 63a and the top plate 65. The coil 74 is connected to a driving circuit through a terminal means 68.

When a signal current is applied to the driving coil 74, the vibrating assembly 66 vibrates. The vibration is transmitted to a wearer through the first frame 61 and a case of a portable device in which the vibrating device 53 is mounted.

The conventional vibrating device has disadvantages that the coil 74 breaks by lateral movement of the yoke 63a and top plate 65 when receiving external shock.

SUMMARY OF THE INVENTION

An object of the present invention is to provide a vibrating device a vibrating assembly of which is protected from external shock.

According to the present invention, there is provided a vibrating device comprising a frame, a vibrating assembly comprising a yoke having a center pole and a peripheral flange, an annular permanent magnet secured to the flange, and an annular top plate secured to the permanent magnet, supporting means for resiliently supporting the vibrating assembly in the frame, an annular driving coil inserted in a magnetic gap formed between the yoke and the top plate, preventing means for preventing the vibrating assembly from being moved in a radial direction of the vibrating assembly.

The device further comprises a cylindrical center piece secured in the center pole of the yoke.

The preventing means comprises a hole formed in the center piece at an axis, and a central shaft securely mounted in the frame and slidably engaged in the hole of the center piece.

These and other objects and features of the present invention will become more apparent from the following detailed description with reference to the accompanying drawings.

DETAILED DESCRIPTION OF THE PREFERRED EMBODIMENT

Figure 1:
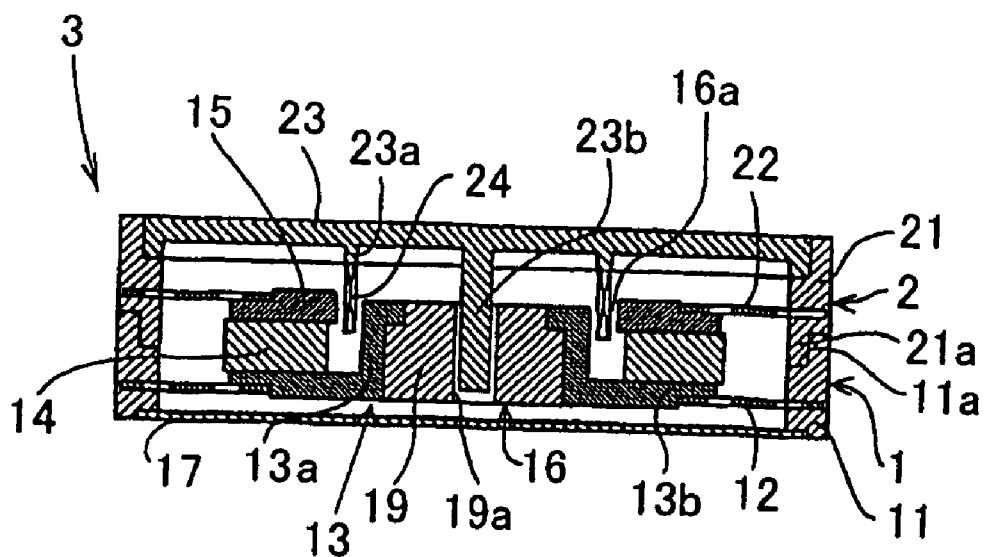
FIG. 1 is a sectional view showing a vibrating device of the present invention.
Figure 2:
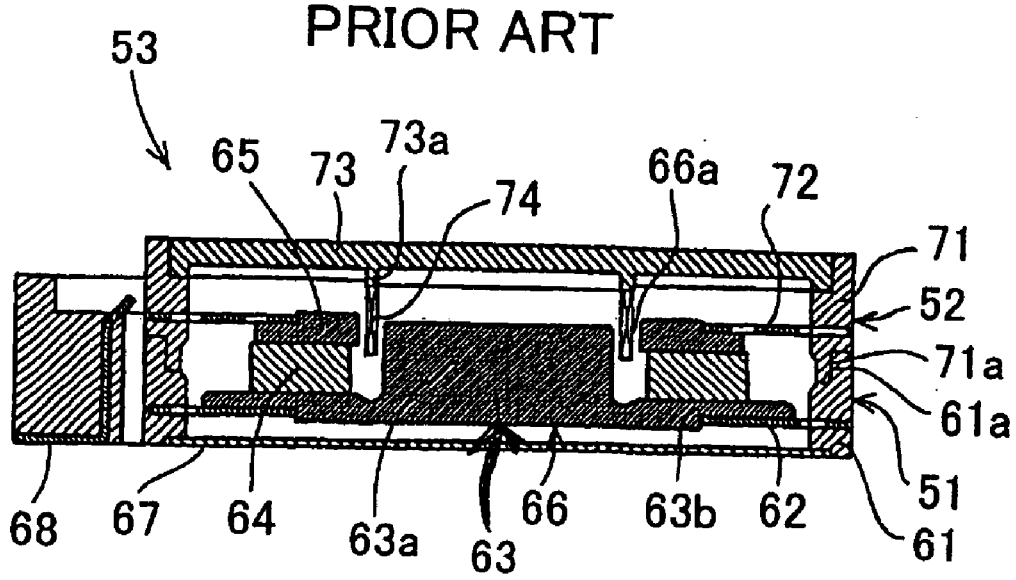
FIG. 2 is a sectional view showing a conventional vibrating device.

FIG. 1 is a sectional view showing a vibrating device of the present invention.

The vibrating device 3 comprises a first assembly 1 and a second assembly 2. The first assembly 1 comprises a first frame 11 made of resin and having a dish-like shape and a vibrating assembly 16 resiliently supported in the first frame by an annular spring plate 12. The vibrating assembly 16 comprises a yoke 13 made of magnetic material and having a cylindrical central pole 13a and a flange 13b, an annular permanent magnet 14 secured to the flange 13b, and an annular top plate 15 made of magnetic material and secured to the permanent magnet 14. The underside of the first frame 11 is covered by a protector 17.

The second assembly 2 comprises a second frame 21 made of resin and secured to the first frame 11 at shoulders 11a and 21a, and an annular spring plate 22 embedded in the second frame 21 and secured to the top plate 15 for holding the vibrating assembly 16. A supporting plate 23 is secured to the second frame 21 to close the second frame 21. An annular driving coil 24 is secured to an annular projection 23a formed on the underside of the supporting plate 23. The coil 24 is inserted in a magnetic gap 16a between the center pole 13a and the top plate 15. The coil 24 is connected to a driving circuit.

In accordance with the present invention, a cylindrical center piece 19 made of a material having a specific gravity heavier than iron is secured in the cylindrical center pole 13a of the yoke 13. The center piece 19 has a central perforated hole 19a at the axis of the center piece 19. On the other hand, a central shaft 23b is downwardly projected from the underside of the coil supporting plate 23 and slidably engaged with the central perforated hole 19a of the center piece 19.

When a signal current is applied to the driving coil 24, the vibrating assembly 16 vibrates in the axial direction. The vibration is transmitted to a wearer through the first frame 11 and a case of a portable device in which the vibrating device 3 is mounted.

Since the vibrating assembly 16 is prevented from vibrating in the radial direction by the central shaft 23b slidably engaged with the central hole 19a of the center piece 19, the vibrating assembly 16 does not move in the radial direction. Consequently, the vibrating assembly 16 is protected from external shock, so that the driving coil 24 does not break.

Although, in the above described device, the central shaft 23b is engaged with the hole 19a of the central piece 19, it is possible to use a yoke without the central piece and to engage the central shaft with a hole formed in the yoke.

While the invention has been described in conjunction with preferred specific embodiment thereof, it will be understood that this description is intended to illustrate and not limit the scope of the invention, which is defined by the following claims.

What is claimed is:

1. A vibrating device comprising:
   a frame;
   a vibrating assembly comprising a yoke having a center pole and a peripheral flange, an annular permanent magnet secured to the flange, and an annular top plate secured to the permanent magnet;

supporting means for resiliently supporting the vibrating assembly in the frame;

a supporting plate secured to a top portion of the frame;

an annular driving coil secured to the underside of the supporting plate and inserted in a magnetic gap formed between the yoke and the top plate; and a central shaft downwardly projected from the supporting plate, the central shaft being slidably engaged with a central hole formed in the center vole of the yoke, thereby preventing the vibrating assembly from being moved in a radial direction of the vibrating assembly.

2. The device according to claim 1 further comprising a cylindrical center piece secured in the center pole of the yoke, the central hole being formed in the cylindrical center piece.

3. The device according to claim 2 wherein the center piece has a specific gravity heavier than iron.

* * * * *